United States Patent
Weiden et al.

(10) Patent No.: US 8,118,492 B2
(45) Date of Patent: Feb. 21, 2012

(54) PLAIN BEARING AND PLAY-FREE PLAIN BEARING ARRANGEMENT

(75) Inventors: Janaki Weiden, Bergisch-Gladbach (DE); Hans-Jürgen Jäger, Hürth (DE)

(73) Assignee: Saint-Gobain Performance Plastics Pampus GmbH, Willich (DE)

( * ) Notice: Subject to any disclaimer, the term of this patent is extended or adjusted under 35 U.S.C. 154(b) by 631 days.

(21) Appl. No.: 12/296,045

(22) PCT Filed: Mar. 26, 2007

(86) PCT No.: PCT/EP2007/052860
§ 371 (c)(1),
(2), (4) Date: Feb. 11, 2009

(87) PCT Pub. No.: WO2007/113157
PCT Pub. Date: Oct. 11, 2007

(65) Prior Publication Data
US 2009/0180720 A1    Jul. 16, 2009

(30) Foreign Application Priority Data
Apr. 6, 2006  (DE) .......................... 10 2006 016 612

(51) Int. Cl.
*F16C 17/00* (2006.01)
(52) U.S. Cl. ....................................... 384/276; 384/295
(58) Field of Classification Search ............ 384/271–273, 384/276, 295–301, 440
See application file for complete search history.

(56) References Cited

U.S. PATENT DOCUMENTS

| | | | |
|---|---|---|---|
| 2,557,259 A * | 6/1951 | Chason | 384/273 |
| 2,897,017 A * | 7/1959 | Kubodera | 384/273 |
| 3,033,623 A | 5/1962 | Thomson | |
| 3,363,745 A | 1/1968 | Thuerman et al. | |
| 3,366,356 A | 1/1968 | Fisher | |
| 4,293,942 A | 10/1981 | Baumgartner | |
| 4,358,167 A | 11/1982 | Magazian et al. | |
| 5,229,198 A | 7/1993 | Schroeder | |
| 5,836,699 A * | 11/1998 | Back et al. | 384/276 |

FOREIGN PATENT DOCUMENTS

| | | |
|---|---|---|
| DE | 11 161 814 | 1/1964 |
| DE | 18 17 036 | 6/1970 |
| DE | 76 27 011 | 1/1977 |
| DE | 77 01 856 | 4/1977 |
| DE | 29 42 322 | 6/1980 |
| DE | 32 19 802 | 12/1982 |
| DE | 87 00 792 | 3/1987 |
| DE | 10 124 843 | 11/2002 |
| DE | 10 2004 056265 | 6/2005 |
| GB | 902696 | 8/1962 |
| WO | WO 00/52348 | 9/2000 |

OTHER PUBLICATIONS

International Search Report for International Application No. PCT/EP2007/052860, Date of Mailing Jun. 22, 2007 (3 pages).

* cited by examiner

*Primary Examiner* — Thomas R Hannon
(74) *Attorney, Agent, or Firm* — Proskauer Rose LLP

(57) ABSTRACT

A play-free plain bearing arrangement with a defined preset torque includes a plain bearing, wherein the plain bearing comprises a bearing housing and a bearing sleeve inserted into the bearing housing, wherein the bearing sleeve and the bearing housing are open axially. The play-free plain bearing arrangement also includes a shaft as a bearing mate of the bearing sleeve. The plain bearing arrangement is characterized in that the shaft having an oversize is inserted in the bearing sleeve in such a way that the bearing sleeve and the bearing housing expand.

27 Claims, 2 Drawing Sheets

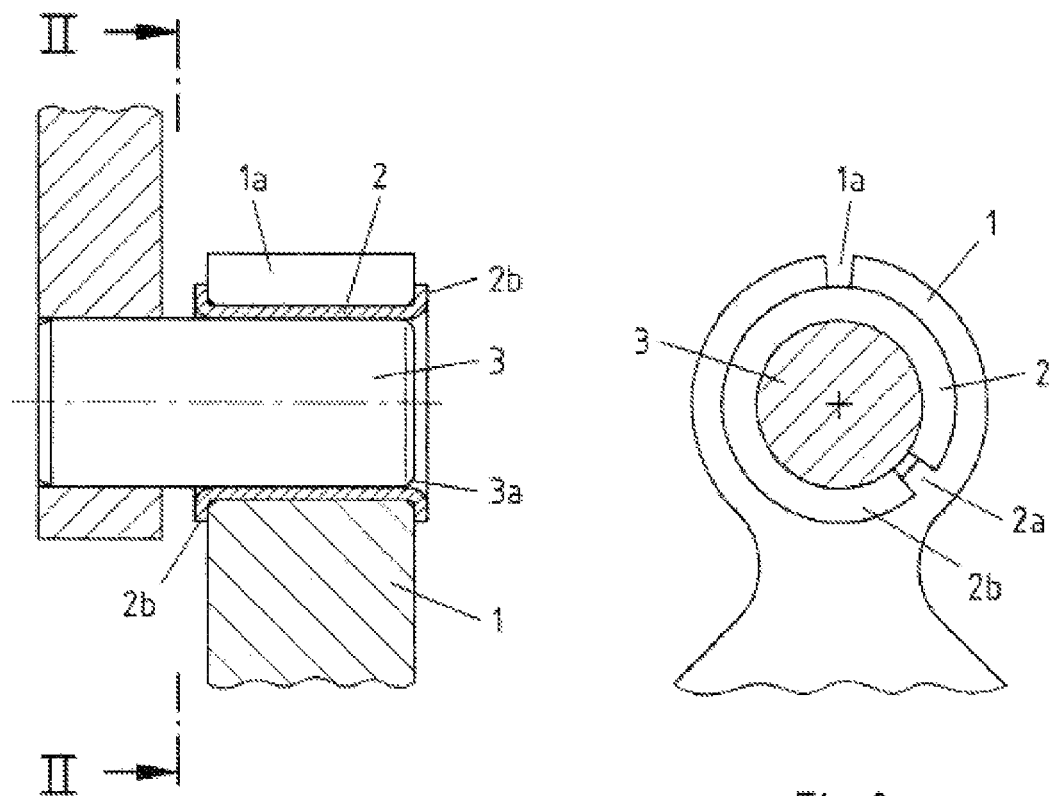
Fig.1
Fig.2
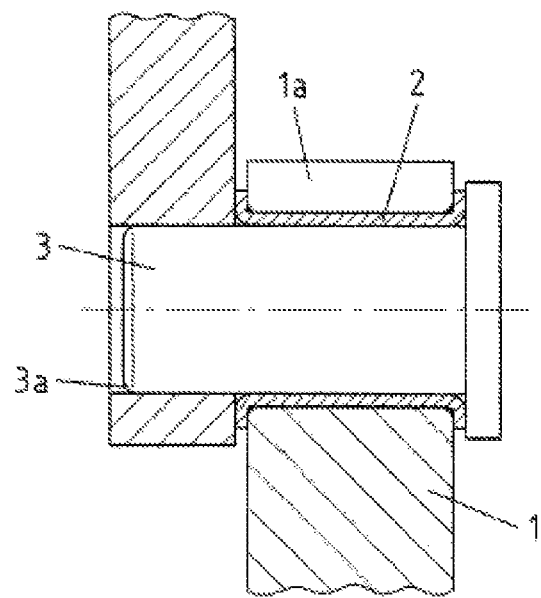
Fig.3

PLAIN BEARING AND PLAY-FREE PLAIN BEARING ARRANGEMENT

CROSS-REFERENCE TO RELATED APPLICATIONS

This application is a National Phase Application of International Patent Application No. PCT/EP2007/052860, filed on Mar. 26, 2007, which claims the benefit of and priority to German Patent Application No. DE 10 2006 016 612.4, filed on Apr. 6, 2006, which is owned by the assignee of the instant application. The disclosure of each of these applications is incorporated herein by reference in its entirety.

FIELD OF THE INVENTION

The invention relates to a plain bearing having a bearing housing and a bearing sleeve inserted into the bearing housing, wherein the bearing sleeve is open axially. The invention also relates to a play-free plain bearing arrangement with a defined preset torque.

BACKGROUND OF THE INVENTION

Play-free plain bearing arrangements with a slotted plain bearing sleeve have been known in the art for some time and are used in various industrial applications, such as hinges, for example. Something that frequently proves disadvantageous in relation to these is that a play-free bearing of a component in a plain bearing with a defined preset torque, particularly with a very small torque, can only be achieved with the greatest technical expenditure and in many cases not at all.

The compression and, associated with this, the torque over the service life of the plain bearing depend on the production tolerances of the individual components, the wear to which the plain bearing is subjected during operation and also the temperature fluctuations during operation. In the latter case, the different thermal expansion coefficients of the materials used are particularly significant. The effects of the aforementioned factors can only be offset for an operating situation with a given temperature, production tolerance and wear with a high level of technical expenditure. Different operating conditions inevitably lead to an uncontrolled change in compression and therefore a different torque.

SUMMARY OF THE INVENTION

In an aspect, the invention features a plain bearing and a play-free plain bearing arrangement, wherein the plain bearing or the plain bearing arrangement can still be used under changing operating conditions throughout their entire service life with a defined torque.

In an embodiment of the invention, the plain bearing and play-free plain bearing arrangement includes a bearing housing that is open axially.

According to an embodiment of the invention, both a bearing sleeve and the bearing housing are open axially. An axial opening within the meaning of the invention is any opening running axially through the bearing sleeve or the bearing housing, thereby producing a peripheral area of the corresponding component that is no longer closed. The axial opening preferably takes the form of an axial slot in both the bearing sleeve and also the bearing housing.

The plain bearing according to the invention is suitable for use over a wide load range. Consequently, permanent use over a broad range with a specific bearing load $\bar{p}$ of between 0.1 and over 100 MPa is possible and also a bearing speed of between 0.001 and around max 2 m/s.

The torque of a plain bearing arrangement to be executed using the plain bearing according to the invention can be set virtually at will through the rigidity of the housing chosen. In this case, the rigidity of the plain bearing housing is crucially dependent on the properties of the housing material, the material thickness and the housing geometry chosen in each case. For very low torques, the bearing housing is preferably made from a plastic, particularly a plastic with thin walls that can be processed by injection moulding. This plastic is advantageously sprayed around the bearing sleeve, in order to produce the housing. In addition, the housing should preferably have thin walls in the case of very low torques.

If high torques are required, the housing should preferably be made from a particularly rigid, typically metallic material. This may be a cast material, particularly steel or an aluminium alloy. The use of a shape memory alloy is particularly advantageous. This has the characteristic of returning to its earlier "stored" shape above a material-specific critical temperature. An alloy in which these characteristics are particularly prevalent is a nickel-titanium alloy.

The axially open bearing sleeve may be made from different materials. It will preferably contain a plastic as the sliding material, preferably a high-temperature plastic, particularly preferably a fluoroplastic, particularly polytetrafluoroethylene, polyimide, polyamidimide, polyvinylide fluoride, a perfluoralkoxy copolymer, polyetheretherketone, polyethylene, particularly ultra-high molecular weight polyethylene or combinations of these.

Another advantageous embodiment of the invention envisages that the bearing sleeve contains a reinforcing material. This may be a metal, particularly copper, high-grade steel, chrome, nickel, zinc, a zinc-iron alloy, iron, bronze and/or aluminium or an alloy of these. It will preferably have an open structure and particularly be in the form of a cloth, particularly a wire-cloth, expanded metal, non-woven fabric, particularly a metal non-woven fabric and/or perforated metal plate.

In addition, it may be envisaged in the case of the bearing sleeve of the plain bearing according to the invention that the sliding material of the bearing sleeve is connected to a carrier on the back. This provides the bearing sleeve with a particular rigidity and also improves its moulding properties. The carrier is in turn advantageously made from metal, preferably steel, high-grade steel, copper, titanium, bronze, aluminium or an alloy of these.

The axially open bearing sleeve may be produced in a variety of ways. The rolled bearing sleeve embodiment is particularly advantageous, because it is easy to execute. A rolled bearing sleeve is made from endless material, e.g. cut, laminated PTFE film, followed by a moulding stage.

The bearing sleeve advantageously displays at least one axial shoulder, which prevents the bearing sleeve from slipping out of the bearing housing, among other things.

In another aspect, the invention features a play-free plain bearing arrangement in which a shaft having an oversize is inserted into the bearing sleeve in such a way that the bearing sleeve and the bearing housing expand.

The plain bearing arrangement according to the invention exploits the fact that the axially open housing, which is expanded by the insertion of the shaft having an oversize in the bearing sleeve, exerts a constant clamping effect on the shaft, thereby guaranteeing permanent freedom from play.

If the dimensions of the individual components of the plain bearing or the plain bearing arrangement should change over time as a result of temperature fluctuations and/or wear, this will be offset by the constant clamping effect of the axially open housing, such that the defined compression and associated defined torque of the plain bearing are maintained. The plain bearing arrangement according to the invention may be additionally secured axially by a second shoulder.

The clamping force and therefore the torque of the plain bearing arrangement may be very precisely set by the rigidity of the housing, particularly by the material used and the housing wall thickness. In addition, the desired rigidity may also be achieved by a corresponding housing geometry with reinforcing ribs, etc.

The shaft used in the plain bearing arrangement preferably has a radius or bevel on the front. This makes it easier to insert the shaft made for to be oversized according to the invention into the plain bearing.

In addition, the shaft should have a high surface quality suitable for dry-running plain bearings. In this case, the surface roughness of the shaft sensibly lies between 0.02 and 1 μm, preferably between 0.05 and 0.8 μm, particularly between 0.1 and 0.4 μm.

The possible applications of the plain bearing and the plain bearing arrangement according to the invention are multifarious. Particularly advantageous is their use in a car, where a long service life with a defined, time-constant torque is important in the context of changing operating conditions (temperature). In this case, use in an adjustable headlamp suspension ("cornering lamp") is particularly advantageous, as in this case a reduction in freedom of play occurring with time and associated vibrations in the headlamp are noticeable and particularly annoying. Other advantageous application possibilities include notebook hinges, door hinges, printer heads or angle sensors.

BRIEF DESCRIPTION OF THE DRAWINGS

The invention is explained in greater detail below using a drawing depicting an exemplary embodiment. In the figures, FIG. 1 shows a side sectional view of a plain bearing arrangement according to the invention in the form of a movable bearing, FIG. 2 shows a front view of the plain bearing arrangement from FIG. 1 according to the section line II-II, FIG. 3 shows a lateral sectional view of a plain bearing arrangement according to the invention in the form of a fixed bearing and FIG. 4 shows the material of the bearing sleeve in the plain bearing arrangement in FIG. 1 in cross-section.

DESCRIPTION

Figure 4:
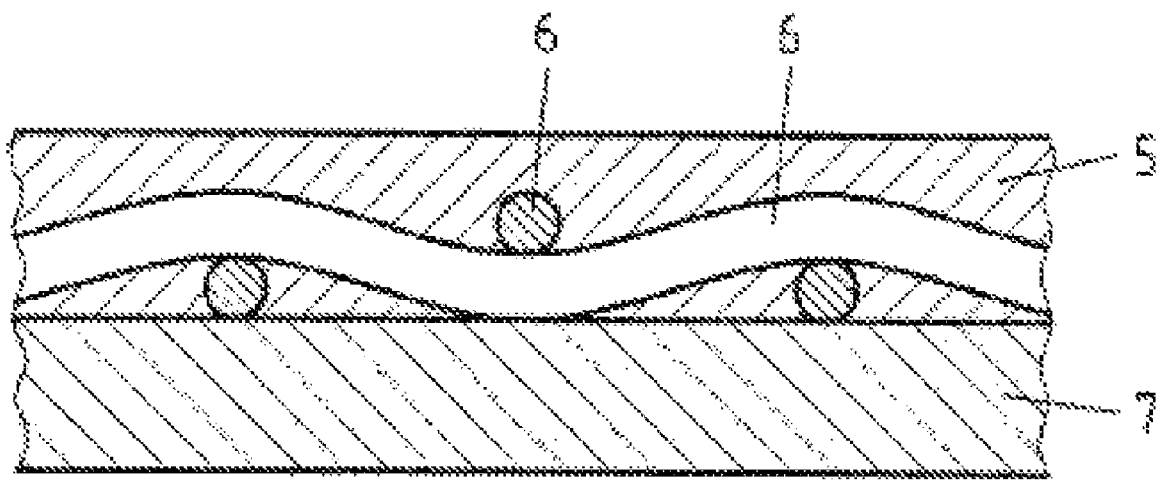

The play-free plain bearing arrangement according to the invention shown in FIG. 1 comprises a bearing housing 1, a bearing sleeve 2 inserted in the bearing housing 1 and a shaft 3 inserted in the bearing sleeve 2 as the bearing mate of the bearing sleeve. The bearing sleeve 2 has an axial shoulder 2b at either end, which produces a fixed seat for the bearing sleeve 2 in the housing 1, preventing it from accidentally slipping out. As is also clear from FIG. 2, both the bearing housing 1 and the bearing sleeve 2 are axially open, while the axial openings of the housing 1 and the sleeve 2 are each in the form of an axial slot 1a, 2a.

In the plain bearing arrangement according to the invention, the shaft 3 having an oversize is inserted in the bearing sleeve 2, in such a way that the bearing sleeve 2 and the bearing housing 1 expand. The shaft 3 has a radius 3a at least at one end, which makes it easier for the shaft 3, which has an oversize relative to the bearing sleeve 2 and the bearing housing 1, to be inserted.

The clamping and spring effect of the expanded housing 1 ensures that the play-free plain bearing arrangement has a constant torque over the entire service of the plain bearing, even under changing operating conditions. In this case the torque is influenced by the material properties of the bearing housing 1, the material thickness used and the housing geometry.

In FIG. 4 the material of the bearing sleeve 2 of the plain bearing arrangement from FIG. 1 is depicted in cross-section. It comprises a layer 5 of sliding material, in the present case a PTFE compound, on the end facing the bearing mate of the bearing sleeve 2. A reinforcing material is provided within the layer 5, which is in the form of a wire-cloth in the present case and may consist of copper, high-grade steel, chrome, nickel, zinc, a zinc-iron alloy, iron, bronze and/or aluminium or an alloy of these. The sliding material layer 5 is connected at the back to a solid carrier 7. This is made from metal in the present case, preferably steel, high-grade steel, copper, titanium, bronze, aluminium or an alloy of these.

The plain bearing arrangement shown in FIGS. 1 to 3 is used, for example, in an adjustable headlamp assembly in a car, wherein the bearing housing is part of a frame rigidly connected to the car body and the shaft is in turn connected to the carrier of a horizontally and/or vertically adjustable headlamp unit. If the dimensions of the individual components of the plain bearing or the plain bearing arrangement change in time as a result of temperature fluctuations and/or wear, this change is offset by the constant clamping effect of the axially open housing, so that the defined compression and associated defined torque of the plain bearing are retained.

The plain bearing arrangement according to the invention makes it possible to achieve a play-free bearing with a defined preset torque, even when using axially open bearing sleeves. Consequently, it is now possible to design plain bearings like needle bearings and ball bearings in play-free form, too.

The invention claimed is:

1. A play-free plain bearing arrangement with a defined preset torque having a plain bearing, wherein the plain bearing comprises a bearing housing and a bearing sleeve inserted into the bearing housing, wherein the bearing sleeve and the bearing housing are open axially, and having a shaft as the bearing mate of the bearing sleeve, wherein the shaft having an oversize is inserted in the bearing sleeve, in such a way that the bearing sleeve and the bearing housing expand.

2. The plain bearing arrangement according to claim 1, wherein an axial opening of the bearing sleeve takes the form of an axial slot.

3. The plain bearing arrangement according to claim 1, wherein an axial opening of the bearing housing takes the form of an axial slot.

4. The plain bearing arrangement according to claim 1, wherein the housing is made from plastic.

5. The plain bearing arrangement according to claim 4, wherein the plastic is a plastic that can be processed by injection moulding.

6. The plain bearing arrangement according to claim 5, wherein the plastic that can be processed by injection moulding is sprayed around the bearing sleeve.

7. The plain bearing arrangement according to claim 1, wherein the housing is made from a metallic material.

8. The plain bearing arrangement according to claim 7, wherein the metallic material is a cast material.

9. The plain bearing arrangement according to claim 7, wherein the metallic material is a shape memory alloy.

10. The plain bearing arrangement according to claim 1, wherein the bearing sleeve contains a plastic as a sliding material.

11. The plain bearing arrangement according to claim 10, wherein the bearing sleeve contains a reinforcing material.

12. The plain bearing arrangement according to claim 11, wherein the reinforcing material is a metal.

13. The plain bearing arrangement according to claim 11, wherein the reinforcing material has an open structure.

14. The plain bearing arrangement according to claim 13, wherein the reinforcing material is in the form of a cloth.

15. The plain bearing arrangement according to claim 10, wherein the sliding material is connected to a carrier on the back.

16. The plain bearing arrangement according to claim 15, wherein the carrier is made from metal.

17. The plain bearing arrangement according to claim 1, wherein the bearing sleeve is a rolled bearing sleeve.

18. The plain bearing arrangement according to claim 1, wherein the bearing sleeve has at least one axial shoulder.

19. The plain bearing arrangement according to claim 1, wherein the torque is set through the rigidity of the housing.

20. The plain bearing arrangement according to claim 19, wherein the torque is set through the rigidity of the housing is set through selection of material forming the housing and a housing wall thickness.

21. The plain bearing arrangement according to claim 1, wherein the shaft has a radius or bevel on a front side of the shaft.

22. The plain bearing arrangement according to claim 1, wherein the surface roughness $R_a$ of the shaft lies between 0.02 and 1 μm.

23. The plain bearing arrangement according to claim 1, wherein the shaft is that of an angle sensor.

24. The plain bearing arrangement according to claim 1, wherein the shaft is that of a door hinge.

25. The plain bearing arrangement according to claim 1, wherein the shaft is that of a printer head.

26. The plain bearing arrangement according to claim 1, wherein the shaft is that of a notebook hinge.

27. The plain bearing arrangement according to claim 1, wherein the shaft is that of an adjustable headlamp suspension.

* * * * *

UNITED STATES PATENT AND TRADEMARK OFFICE
CERTIFICATE OF CORRECTION

PATENT NO. : 8,118,492 B2
APPLICATION NO. : 12/296045
DATED : February 21, 2012
INVENTOR(S) : Janaki Weiden et al.

Page 1 of 1

It is certified that error appears in the above-identified patent and that said Letters Patent is hereby corrected as shown below:

In the Specification

In column 4, line 15, insert --6-- after "material".

Signed and Sealed this
Sixteenth Day of September, 2014

Michelle K. Lee
*Deputy Director of the United States Patent and Trademark Office*